United States Patent
You et al.

(10) Patent No.: US 8,678,438 B2
(45) Date of Patent: Mar. 25, 2014

(54) SEAT BELT APPARATUS FOR VEHICLE

(75) Inventors: Byoung-Gae You, Wonju-si (KR); Sung-Suk Ko, Wonju-si (KR); Ho-Jin Lee, Wonju-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/615,788

(22) Filed: Sep. 14, 2012

(65) Prior Publication Data

US 2013/0069356 A1    Mar. 21, 2013

(30) Foreign Application Priority Data

Sep. 16, 2011 (KR) .......................... 10-2011-0093473

(51) Int. Cl.
*B60R 22/20*       (2006.01)

(52) U.S. Cl.
USPC ....................................... 280/801.2; 297/482

(58) Field of Classification Search
USPC ............ 280/801.1, 808, 801.2; 297/468, 482, 297/483, 486
See application file for complete search history.

(56) References Cited

U.S. PATENT DOCUMENTS

| | | | | | |
|---|---|---|---|---|---|
| 5,476,286 | A * | 12/1995 | Delfino | ...................... | 280/801.2 |
| 6,749,223 | B2 * | 6/2004 | Kazuo et al. | ................ | 280/801.1 |
| 7,597,359 | B2 * | 10/2009 | Gray | ............................. | 280/808 |
| 7,810,843 | B2 * | 10/2010 | Gray | ............................. | 280/808 |
| 2007/0001444 | A1 * | 1/2007 | Smith et al. | ................... | 280/808 |

* cited by examiner

*Primary Examiner* — Paul N Dickson
*Assistant Examiner* — Timothy Wilhelm
(74) *Attorney, Agent, or Firm* — Harness, Dickey & Pierce, P.L.C.

(57) ABSTRACT

A seat belt apparatus for a vehicle including an anchor metal plate coupled with a vehicle body by a fastening bolt to extensively support a seat belt and upper and lower covers to receive the anchor metal plate. A contact rib is formed on at least one side portion of the inner surface of the upper cover, and a sidewall is formed on a side portion of the lower cover to make contact with the contact rib. An arc-type rib is formed on the bottom plate of the lower cover corresponding to an outer peripheral portion of at least one side portion of the base portion of the anchor metal plate, and a connection rib is formed between the arc-type rib and the sidewall. An arc-type slot is formed on the bottom plate of the lower cover.

14 Claims, 7 Drawing Sheets

SEAT BELT APPARATUS FOR VEHICLE

CROSS-REFERENCE TO RELATED APPLICATIONS

This application claims the benefit and priority of Korean Application No. 10 2011 0093473 filed 16 Sep. 2011. The entire disclosure of the above application is incorporated herein by reference.

FIELD

The present disclosure relates to a safety apparatus for a vehicle. More particularly, the present invention relates to a seat belt apparatus for a vehicle.

BACKGROUND

This section provides background information related to the present disclosure which is not necessarily prior art.

A seat belt apparatus for a vehicle prevents secondary impact caused by the collision between the body of an occupant or a steering wheel and an instrument panel of the vehicle upon vehicle collision by supporting the body of the occupant using a seat belt.

In general, in the seat belt of the seat belt apparatus for the vehicle, a lower end portion is supported on a vehicle body by a lap anchor, and a middle portion thereof passes through an anchor metal plate (called "D-ring").

The seat belt prevents the occupant from being inclined in a forward direction of the vehicle. Actually, upon vehicle collision, after the body of the occupant is inclined in the forward direction of the vehicle, the body of the occupant returns to the original position thereof by the seat belt. In this case, the occupant moves left or right when the body of the occupant returns to the original position thereof, so that the head of the occupant collides with an anchor cover and is impacted. Accordingly, the head of the occupant may be injured.

In order to reduce the impact applied to the head of the occupant as described above, various trials, such as the installation of an impact absorbing rib in an anchor cover, have been performed.

SUMMARY

This section provides a general summary of the disclosure, and is not a comprehensive disclosure of its full scope or all of its features.

An object of the present invention is to provide a seat belt apparatus for a vehicle, capable of improving impact absorbing effects by effectively dispersing side impact applied to an anchor of the seat belt apparatus for the vehicle.

Another object of the present invention is to provide a seat belt apparatus for a vehicle, capable of preventing an anchor cover from being damaged, and minimizing HIC(d) (Head Injury Creation) by restricting rotation of an anchor of the seat belt when side impact is applied to the anchor of the seat belt apparatus for the vehicle.

Technical Solution

According to one aspect of the present invention, there is provided a seat belt apparatus for a vehicle comprising a seat belt anchor which is rotatably supported on a vehicle body by using a fastening bolt, and includes an anchor metal plate extensibly supporting a seat belt while allowing the seat belt to pass through the anchor metal plate and upper and lower covers received in the anchor metal plate. The upper cover includes a contact rib protruding from at least one internal side portion toward the lower cover. The lower cover includes a lower sidewall protruding from a rim of a bottom plate thereof and partially making contact with the contact rib, at least one arc rib protruding from a portion adjacent to an edge of a side portion of a base portion of the anchor metal plate, and a connection rib connecting the circular rib to the lower sidewall.

The seat belt apparatus for the vehicle according to the present invention may further include an extending guide assembly installed between the lower cover and the vehicle body to extend the seat belt passing through the anchor metal plate in the forward direction of the vehicle body, so that the seat belt can be extensibly supported.

The extending guide assembly includes a guide bar, which is provided between an outer surface of the lower cover and the vehicle body, allows the fastening bolt to pass therethrough, and has a proximal end rotatable at a predetermined angle about the fastening bolt and a distal end protruding in the forward direction of the vehicle body, a belt guide through which the seat belt having passed through the slot of the anchor metal plate secondarily passes, and a housing securely coupled with the vehicle body to receive the proximal end of the guide bar and rotatably support the guide bar. A stopper may protrude from the cover portion of the housing facing the bottom plate of the lower cover to prevent the seat belt anchor from rotating when the head of the occupant collides with the side portion of the upper cover. At least one arc-type slot may be formed in the bottom plate of the lower cover adjacent to at least one side portion of the base portion of the anchor metal plate, so that the stopper is inserted into the slot.

The seat belt apparatus for the vehicle according to the present invention may include at least one support protrusion having a support step fitted with the edge of the base portion of the anchor metal plate and formed on the inner surface of the bottom plate of the lower cover adjacent to the arc-type rib. A lower coupling protrusion locked with an upper coupling protrusion formed on an internal bottom plate of the upper cover may be integrally formed with one side of the support protrusion of the lower cover.

The seat belt apparatus for the vehicle according to the present invention may include a locking step, which protrudes from one side of the edge of the base portion of the anchor metal plate, and a locking ring portion which is fitted with the locking step and formed on the inner surface of the bottom plate of the lower cover corresponding to a position of the locking step.

The seat belt apparatus for the vehicle according to the present invention may include a locking protrusion and a screw coupling portion protruding from one side of the bottom plate of the lower cover which faces the locking ring portion. An insertion hole may be formed at an opposite side of the anchor metal plate facing the locking step to receive the insertion hole, and a screw coupling hole may be provided so that the screw coupling hole is coupled with the screw coupling portion.

Advantageous Effects

According to a seat belt apparatus for a vehicle of the present invention, when side impact is applied to the upper cover, the impact of the upper cover is transferred to the impact absorbing rib provided inside the lower cover, so that side impact can be effectively dispersed, thereby improving impact absorbing effects.

According to the seat belt apparatus for the vehicle of the present invention, when side impact is applied to the upper cover, the rotation of the anchor of the seat belt is restricted, so that the anchor cover of the seat belt can be prevented from being distorted, thereby minimizing HIC(d) (Head Injury Creation).

According to the seat belt apparatus for the vehicle of the present invention, a coupling structure of supporting the anchor metal plate to the lower cover is improved, so that the anchor metal plate can be securely coupled in the lower cover together with the structure of restricting the rotation of the anchor of the seat belt.

The coupling relation between the upper and lower covers can be improved, thereby preventing the coupling portions of the upper and lower covers from being easily damaged when the head of the occupant collides with the anchor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
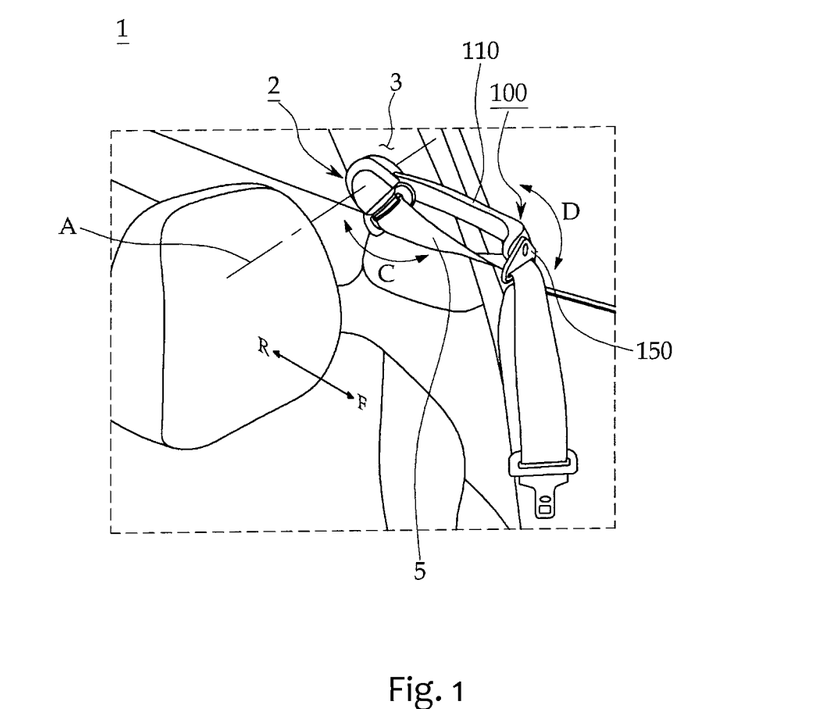
FIG. 1 is a perspective view showing a seat belt apparatus for a vehicle according to the present invention which is mounted on a vehicle body.
Figure 2:
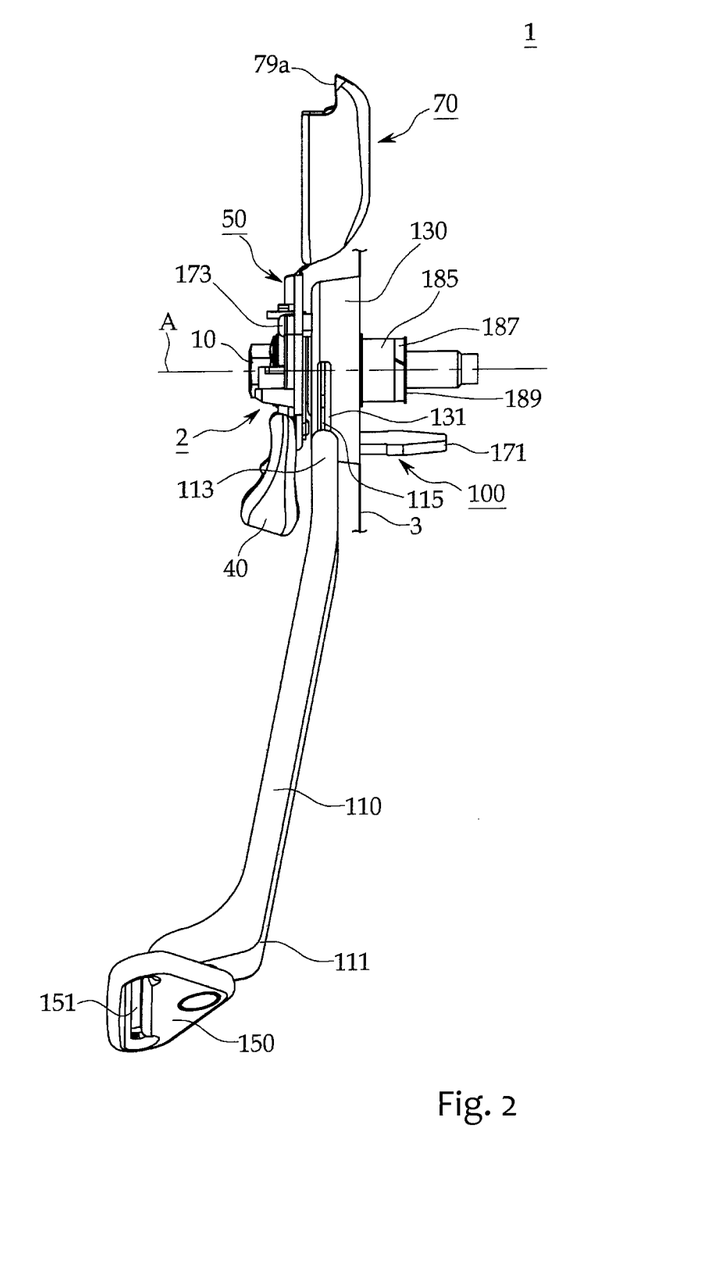
FIG. 2 is a side view showing the seat belt apparatus for the vehicle according to the present invention.

FIG. 1 is a perspective view showing a seat belt apparatus for a vehicle according to the present invention, and FIG. 2 is a side view showing the seat belt apparatus for the vehicle according to the present invention.

Referring to FIGS. 1 and 2, a seat belt apparatus 1 for a vehicle includes a seat belt anchor 2 coupled on a vehicle body 3 (referred to as "B-pillar") by a fastening bolt 10 and an extending guide assembly 100 having a guide bar 110, which is provided between the seat belt anchor 2 and the B-pillar 3 while extending in a forward direction F of the B-pillar 3 and rotatable at a predetermined angle, and a belt guide 150 coupled with a distal end of the guide bar 110.

In general, when the B-pillar 3 is relatively inclined in a rear direction R of the vehicle like a coupe-type vehicle, it may be difficult to fasten a seat belt 5. The extending guide assembly 100 improves the wearability of the seat belt 5 by supporting the seat belt 5 while extending the seat belt 5 in the forward direction F of the B-pillar 3.

In order to improve the wearability of the seat belt 5, the seat belt anchor 2 is supported to rotatably reciprocate in an arrow direction C about a central axis A of the fastening bolt 10, and the extending guide assembly 100 is supported to rotatably reciprocate in an arrow direction D about the central axis A of the fastening bolt 10 (see FIG. 1).

Figure 3:
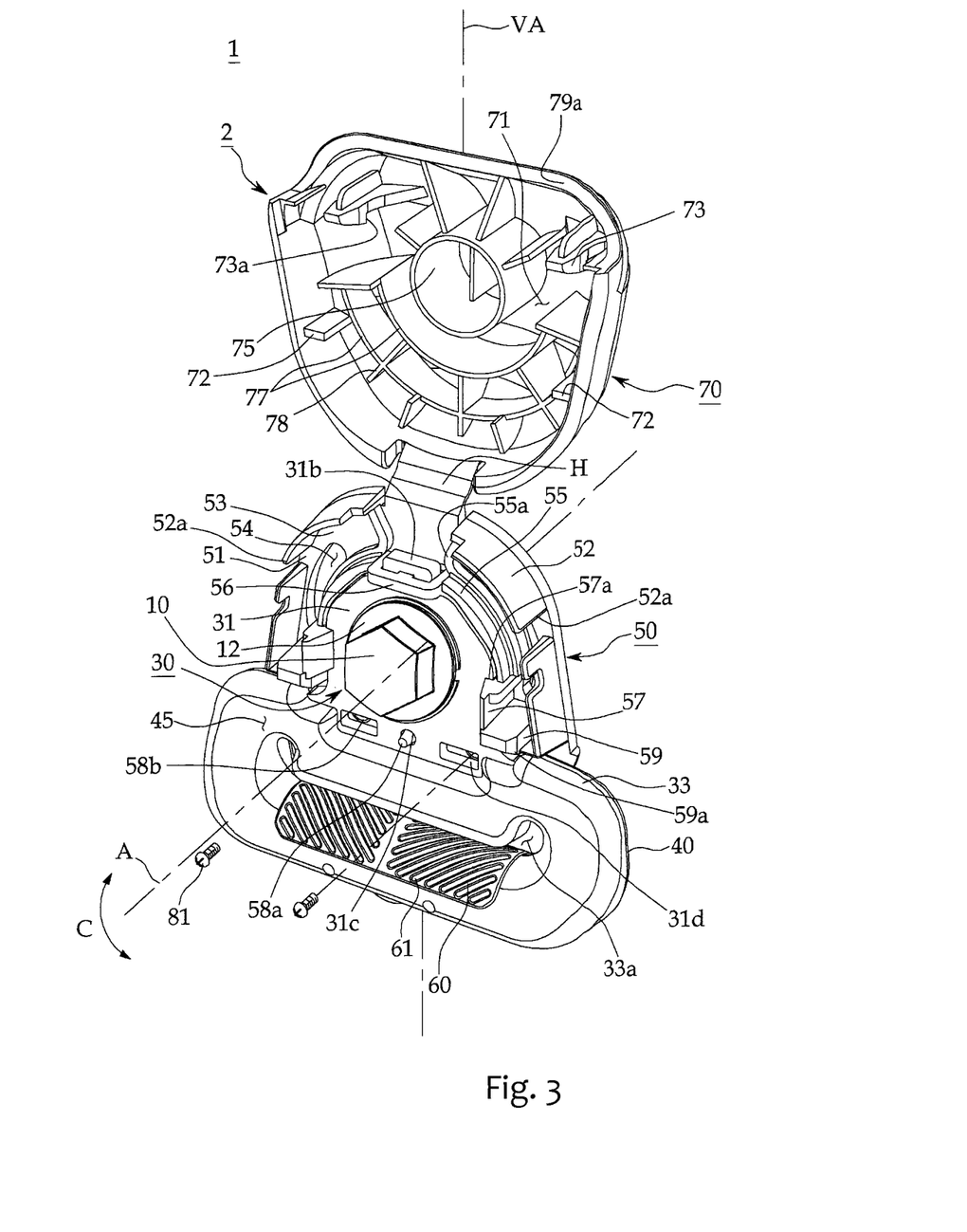
FIG. 3 is an exploded front perspective view showing the seat belt anchor of the seat belt apparatus for the vehicle according to the present invention.
Figure 4:
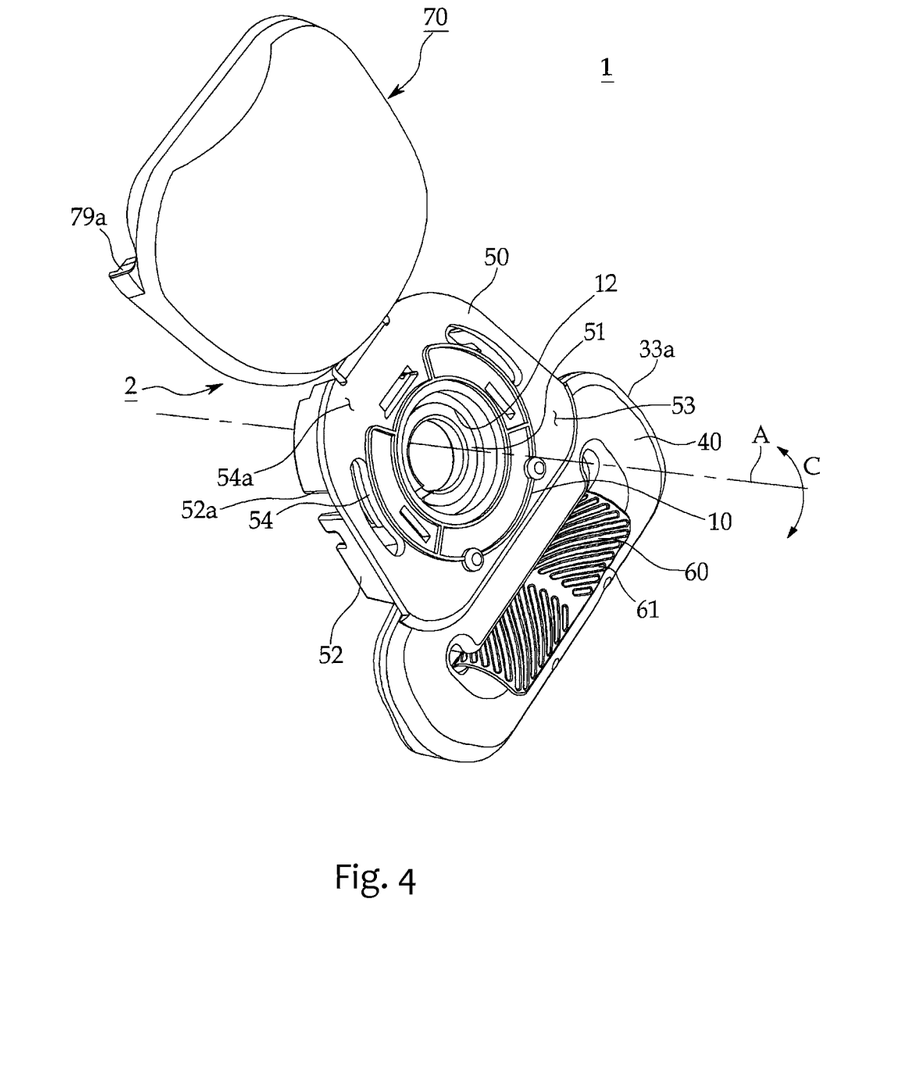
FIG. 4 is an exploded rear perspective view showing the seat belt anchor of the seat belt apparatus for the vehicle according to the present invention.

FIG. 3 is an exploded front perspective view showing the seat belt anchor of the seat belt apparatus for the vehicle according to the present invention, and FIG. 4 is an exploded rear perspective view showing the seat belt anchor of the seat belt apparatus for the vehicle according to the present invention.

Referring to FIGS. 3 and 4, the seat belt anchor 2 includes an anchor metal plate 30, a lower cover 50, and an upper cover 70.

The anchor metal plate 30 is formed by pressing a metallic plate, such as steel, having sufficient stiffness and includes a base portion 31 and a free end portion 33.

The base portion 31 of the anchor metal plate 30 is supported on an inner side wall of an upper portion of the B-pillar 3 by allowing the fastening bolt 10 to pass through the base portion 31.

A bushing 12 is interposed between the anchor metal plate 31 and the fastening bolt 10, so that the seat belt anchor 2 including the lower and upper covers 50 and 70 as well as the anchor metal plate 31 is rotatably supported such that the seat belt anchor 2 can reciprocate in the arrow direction C about the central axis A.

The free end portion 33 of the anchor metal plate 30 is formed therein with a slot 33a to extensibly support the seat belt 5. A covering 40 including synthetic resin is formed around the slot 33a to increase the radius of curvature of a lower edge of the slot 33a, thereby preventing the seat belt 5 inserted into the slot 33a from being folded with the smaller radius of curvature. Accordingly, when the seat belt 5 is pulled upon vehicle collision, the seat belt 5 is prevented from being damaged.

A metallic edge liner 60 is provided on an outer surface 45 of the covering 40 corresponding to a lower edge of the slot 33a, thereby preventing the covering 40 from being damaged when the seat belt 5 works upon sudden braking or vehicle collision so that the force to pull the seat belt 5 is significantly applied to the outer surface 41 of the covering 40.

The lower cover 50 includes synthetic resin, and is formed therein with a through hole 51 through which the fastening bolt 10 passes, and has an internal structure coupled with the anchor metal plate 30. The lower cover 50 is covered with the upper cover 70.

In order to represent sufficient flexibility, the upper cover 70 includes synthetic resin such as poly propylene and has a thinner thickness. An impact absorbing rib 75 is formed on an inner surface of a bottom plate 71 of the upper cover 70 toward a head portion 11 of the fastening bolt 10.

At least one arc-type rib 55 having a shape corresponding to that of the rim of the base portion 31 of the anchor metal plate 30 is formed on the inner surface of the bottom plate 53 of the lower cover 50 so that the anchor metal plate 30 is seated on the bottom plate 53 of the lower cover 50.

A locking step 31b protrudes from an upper end of the base portion 31, and a locking ring portion 56 is formed on the bottom plate 53 of the lower cover 50 between upper ends of arc-type ribs 55 so that the locking step 31b is fitted into the locking ring portion 56.

A support protrusion 57 having a support tip 57a is formed on the bottom plate 53 of the lower cover 50 corresponding to a lower portion of the arc-type rib 55 in such a manner that the support tip 57a can be fitted with the rim of the base portion 31 of the anchor metal plate 30.

An insertion hole 31c is formed in one side of the base portion 31 corresponding to the position of the locking step 31b with respect to the central axis A of the fastening bolt 10, and an insertion protrusion 58a protrudes from the bottom plate 53 corresponding to the position of the insertion hole 31c, so that the insertion protrusion 58a is inserted into the insertion hole 31c.

Screw coupling holes 31d are formed in both sides of the insertion hole 31c of the base portion 31 of the anchor metal plate 30, screw coupling portions 58b protrude from both sides of the insertion protrusion 58a of the bottom plate 53 of the lower cover 50 so that the screw coupling portions 58b are inserted into the screw coupling holes 31d, and coupling screws 81 are coupled through the screw coupling portions 58b, so that the base portion 31 of the anchor metal plate 30 is fixed to the bottom plate 53 of the lower cover 50.

A lower coupling protrusion 59 is formed at a predetermined position of the bottom plate 53 adjacent to the support protrusion 57, so that the lower coupling protrusion 59 is coupled with an upper coupling protrusion 73 formed on the upper cover 70.

The upper and lower coupling protrusions 73 and 59 have shapes corresponding to each other, and locked with each other by locking steps 73a and 59a.

The lower coupling protrusion 59 is integrally formed with the support protrusion 57 to complement reinforcement force, and the force to support the upper coupling protrusion 73 is complemented by a reinforcement rib 73b.

The impact absorbing rib 75 is formed on an inner surface of the bottom plate 71 of the upper cover 70 and makes contact with the head portion 11 of the fastening bolt 10 so that the impact absorbing rib 75 is compression-deformed or crushable when the head of an occupant collides with the upper cover 70.

The impact absorbing rib 75 is formed in the shape of a circle about the central axis A of the fastening bolt 10. The impact absorbing rib 75 has a depth satisfying the extent that the impact absorbing rib 75 is spaced apart from the head portion 11 of the fastening bolt 10 by a predetermined distance when the upper cover 70 is closed. The diameter of the circle of the impact absorbing rib 75 is smaller than the circumference of the head portion 11 of the fastening bolt 10, so that the impact absorbing rib 75 makes contact with the head portion 11 when the outer wall of the upper cover 70 is impacted. Therefore, the impact absorbing rib 75 is compression-deformed or crushable.

At least one arc-shape additional rib 77 is concentrically formed with the impact absorbing rib 75 on an outer peripheral portion of the impact absorbing rib 75. A plurality of radial ribs 78 are formed between the impact absorbing rib 75 and arc-shape additional ribs 77.

The impact absorbing rib 75, the arc-shape additional ribs 77, and the radial ribs 78 are formed on the inner surface of the bottom plate 71 of the upper cover 70 while being formed on the same plane.

The upper cover 70 has an upper sidewall 79 fitted with the outer surface of a lower sidewall 52 of the lower cover 50, and is provided at a lower portion thereof with a cutting portion 79a to prevent the interference with an upper surface 45 of the covering 40 facing the occupant.

The upper cover 70 has a curved outer surface to reduce the injury caused to the head of the occupant when colliding with the head of the occupant.

The occupant is moved in an occupant chamber upon the vehicle collision, especially, vehicle side collision, and the head of the occupant collides with the outer surface of the upper cover 70 so that the upper cover 70 is impacted.

If the upper cover 70 is impacted, the upper cover 70 is deformed inwardly, so that the impact absorbing rib 75 may make contact with the surface of the head portion 11 of the fastening bolt 10, or the arc-shape additional ribs 77 may be crushed or compression-deformed after making contact with one surface of the base portion 31 of the anchor metal plate 30. Accordingly, impact energy resulting from the vehicle collision is absorbed through such deformation, thereby more effectively reducing the injury to the head of the occupant.

When the upper cover 70 is impacted in other directions except for the direction of the central axis A, the impact is dispersed throughout the whole upper cover 70 by forming the impact absorbing rib 75 in the shape of a circle and forming the arc-shape additional ribs 77 in the shape of an arc, thereby reducing the change in impact absorbing ability that may be caused by the impact applied at a predetermined angle about the central axis A.

In addition to the circular structure of the impact absorbing rib 75 and the arc structure of the additional ribs 77, the radial ribs 78 are provided in the radial form between the impact absorbing rib 75 and the additional ribs 77, so that the dispersion effect of the impact can be increased.

In addition, connection ribs 55a are interposed between the arc-type rib 55 and the sidewall 52 of the lower cover 50, and contact ribs 72 protrude from at least one inner side of the upper sidewall 77 of the upper cover 70 to make contact with opened end portions 52a of the lower sidewall 52. Preferably, the contact ribs 72 are formed at a position where there is high possibility of strike in the lateral direction.

Due to the above structure, when the head of the occupant collides with the side portion of the upper cover 70 in a direction inclined with respect to the central axis A of the fastening bolt 10, the impact is transferred and dispersed to the lower sidewall 52, the connection ribs 55a, and the arc-type ribs 55 of the lower cover 50 through the contact ribs 72, so that side impact can be effectively reduced.

Preferably, the contact ribs 72 of the upper cover 70, and lower sidewalls 52, the arc-type ribs 55, and the connection ribs 55a of the lower cover 50 are paired symmetrically to each other about a vertical axis VA. As described above, the above components are symmetrical to each other about the vertical axis VA, so that the components can be employed in driver and passenger seats in common.

Figure 5:
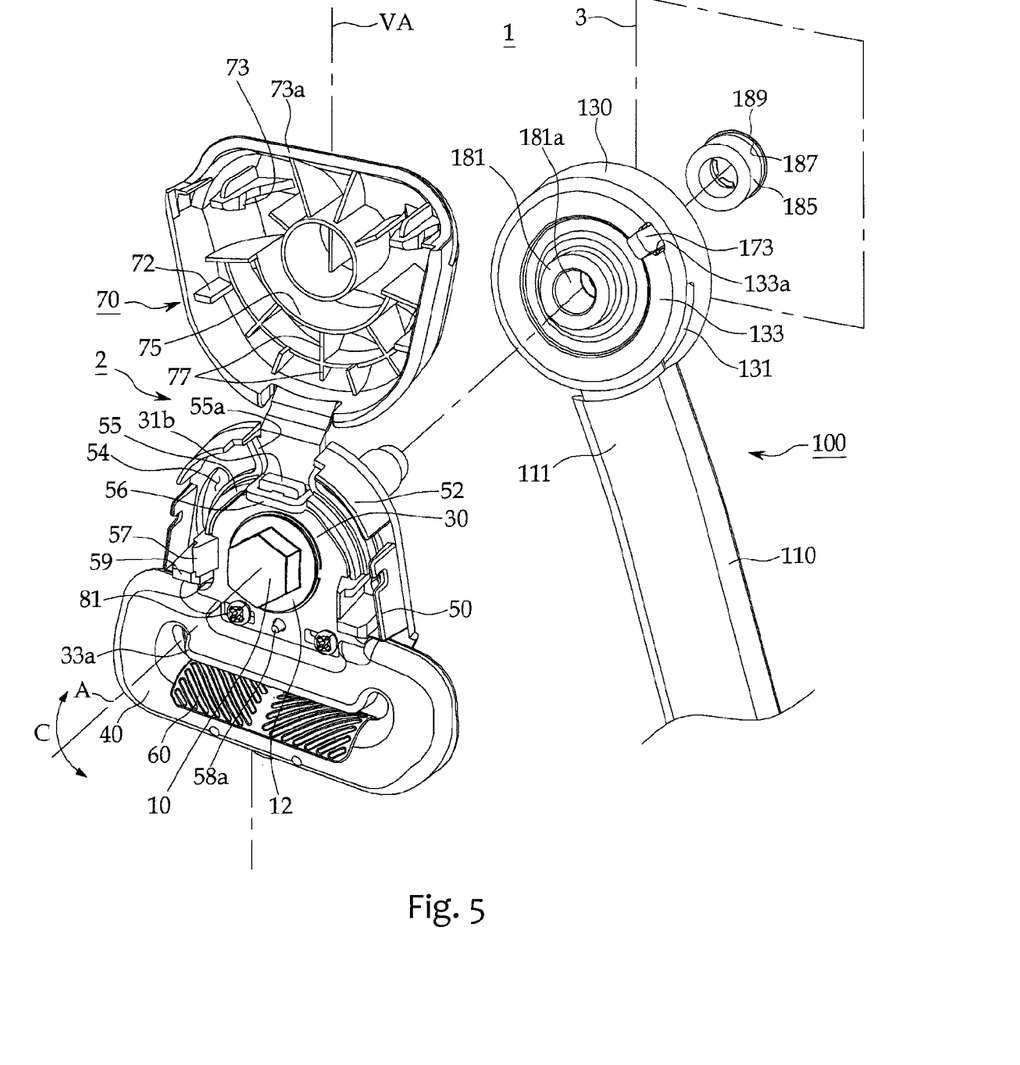
FIG. 5 is an exploded front perspective view showing a portion of the seat belt apparatus for the vehicle according to the present invention.
Figure 6:
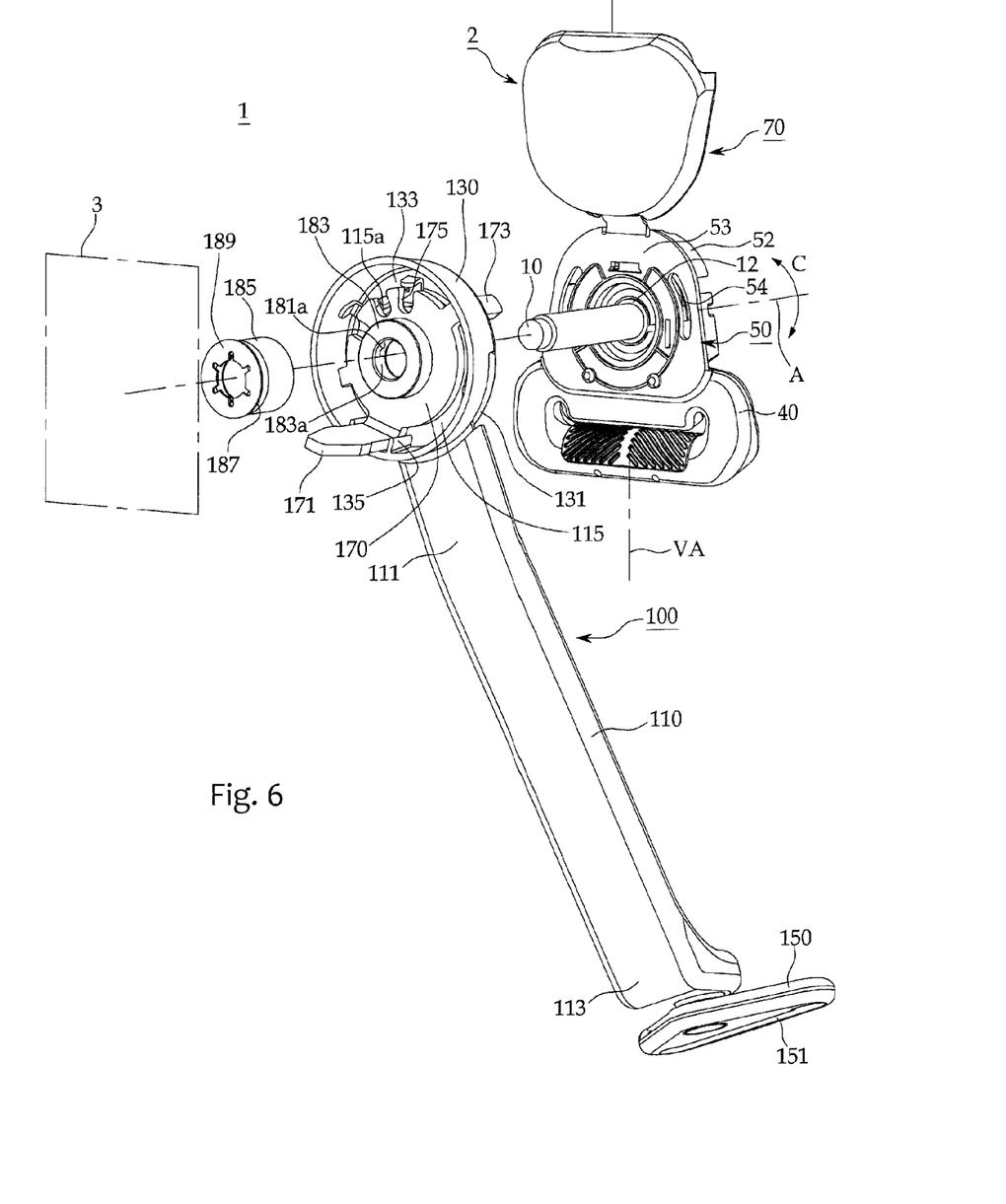
FIG. 6 is an exploded rear perspective view showing a portion of the seat belt apparatus for the vehicle according to the present invention.

FIG. 5 is an exploded front perspective view showing the seat belt anchor apparatus according to the present invention, and FIG. 6 is an exploded rear perspective view showing the seat belt anchor apparatus according to the present invention.

Hereinafter, the extending guide assembly 100 will be described in detail with reference to FIGS. 5 and 6.

The extending guide assembly 100 includes the guide bar 110, a housing 130, the belt guide 150, and a support member 170.

The guide bar 110 includes a proximal end 111 rotatably supported in the housing 130 installed between the outer portion of the lower cover 50 of the seat belt anchor 2 and the B-pillar 3 and a distal end 113 protruding in the forward direction F of the vehicle and coupled with the belt guide 150.

A connection bracket 115 is additionally connected to the proximal end 111 of the guide bar 110 so that the proximal end 111 is supported in the housing 130 to rotate at a predetermined angle.

The belt guide 150 is formed therein with a guide hole 151. The seat belt 5, which has passed through the slot 33a of the free end portion 33 of the anchor metal plate 30, secondarily passes through the guide hole 151 so that the seat belt 5 is extensibly supported.

The housing 130 includes a slit hole 131 inclined at a predetermined angle so that a portion of the connection bracket 115 passes through the slit hole 131 to rotate at the angle, and a cover portion 133 provided at one end thereof to face the outer surface of the bottom plate 53 of the lower cover 50. The housing 130 has the shape of a cylinder having an open opposite end.

The support member 170 has the shape of a disc to be nested on the connection bracket 115. The support member 170 includes a coupling protrusion 171, which protrudes from one side of an edge thereof toward an open side of the housing 130 to be fixed onto the vehicle body 3, and a stopper 173 provided at an opposite side of the edge thereof to pass through the arc-type slot 54 formed in the bottom plate 53 of the lower cover 50 after passing through a hole 133a of the cover portion 133 of the housing 130.

The slot 54 has the shape of a arc-type corresponding to the rotation locus of the lower cover 50 to prevent the lower cover 50 from interfering with the stopper 173 when the seat belt anchor 2 performs rotational reciprocating motion along the arrow direction C about the central axis A of the fastening bolt 10.

When the head of the occupant collides with the side portion of the upper cover 70 of the seat belt anchor 2, the stopper 173 restricts the rotation of the seat belt anchor 2 and minimizes the distortion or the crush of the upper cover 70, thereby minimizing the injury to the head of the occupant.

Preferably, arc-type slots 54 are paired symmetrically to each other about the vertical axis VA. When the arc-type slots 54 are paired symmetrically to each other about the vertical axis VA as described above, the seat belt anchor 2 can be used for both the driver and passenger seats in common.

As the distortion of the upper cover 70 is minimized as described above, the upper and lower coupling protrusions 73 and 59 are prevented from being damaged, so that the injury to the head of the occupant can be reduced.

The stopper 173 is not limited to the structure of protruding from the support member 170 of the extending guide assembly 100, but may have various modifications if the stopper 173 is fixed to the vehicle body 3 without the movement thereof.

The coupling protrusion 171 of the support member 170 is fitted between support ribs 135 formed on the inner surface of the housing 130 in adjacent to the slit hole 131 of the housing 130, so that the housing 130 is fixed onto the B-pillar 3.

A connection tube 181 having a through hole 181a for the fastening bolt 10 extends through the central portions of the cover portion 133 of the housing 130, the connection bracket 115, and the support member 170. A support tube 183 having a through hole 183a for the fastening bolt 10 is coupled with an end portion of the connection tube 181 positioned in the housing 130 to support the connection bracket 115 and the support member 170 in the housing 130.

A spacer 185, a spring washer 187, and a paper washer 189 are additionally coupled on an end portion of the support tube 183 directed to the vehicle body 3 to complement the coupling force of the fastening bolt 10.

At least three grooves 175 are formed on the edge of the support member 170 adjacent to the stopper 173, and locking portions 115a are formed in the edge of the connection bracket 115 and fitted into the grooves 175, so that the guide bar 100 is maintained at a predetermined angle.

The rotational position of the guide bar 110 is adjusted at a predetermined angle according to the use conditions or the body size of the occupant, so that the wearability of the seat belt 5 can be improved.

Figure 7:
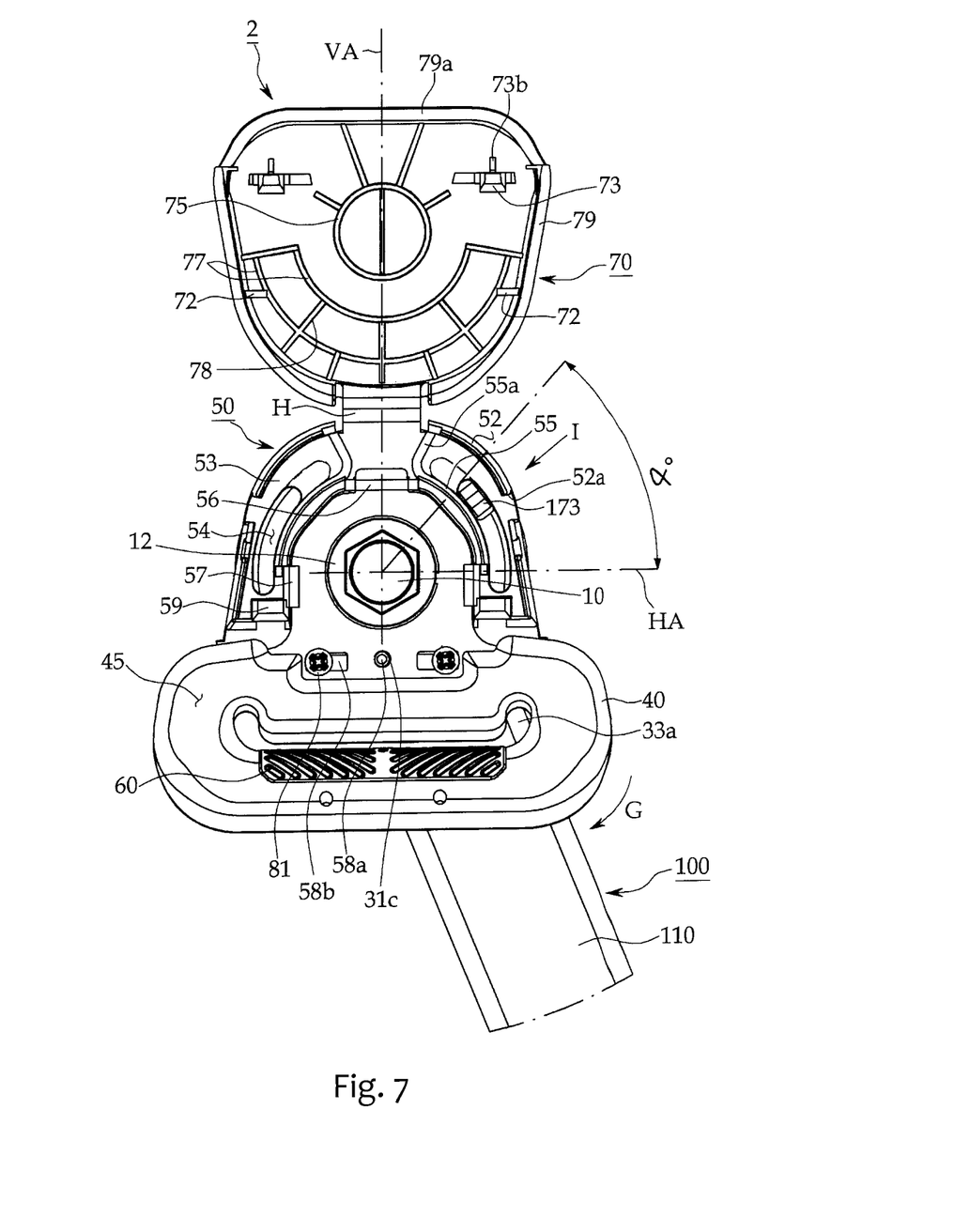
FIG. 7 is a front view showing the seat belt apparatus for the vehicle according to the present invention in which the upper cover is disassembled from the lower cover.

FIG. 7 is a front view showing the seat belt apparatus for the vehicle according to the present invention in which the upper cover is disassembled from the lower cover Referring to FIG. 7, an angle $\alpha°$ between the upper end of the arc-type slot 54 and a horizontal axis HA passing through the center of the fastening bolt 10 is preferably in the range of 40° to 70°. More particularly, the angle $\alpha°$ is 43°.

When the head of the occupant collides with the side portion of the seat belt anchor 2 in an inclined direction I upon vehicle collision, the upper end of the arc-type slot 54 formed in the lower cover 50 is locked with the stopper 173, thereby preventing the seat belt anchor 2 from being rotated in an arrow direction G about the central axis A of the fastening bolt 10. Accordingly, the distortion of the upper cover 70 and/or the lower cover 50 is minimized, so that the coupling portions of the upper and lower covers 70 and 50 are prevented from being damaged. Therefore, the injury to the head of the occupant can be reduced.

The seat belt apparatus for the vehicle according to the present invention satisfies the FMVSS 201 (Federal Motor Vehicle Safety Standards).

In particular, if the angle $\alpha°$ is 43°, when an FMH (Free Motion Head Form) is struck at BP3 which is a target location thereof, the value of HIC(d) approximates 800. For example, the value of HIC(d) may be 820 or 850.

Although the exemplary embodiments of the present invention have been described, it is understood that the exemplary embodiments help one ordinary skilled in the art to easily realize a seat belt apparatus for a vehicle of the present invention, but the present invention should not be limited to these exemplary embodiments and accompanying drawings. Therefore, various changes and modifications can be apparently made by the skilled in the art without departing from the technical spirit of the present invention. In addition, it is understood that parts that can be easily changed by the skilled in the art are within the spirit and scope of the present invention as hereinafter claimed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat belt apparatus for a vehicle, the seat belt apparatus comprising:
   a seat belt anchor having:
      an anchor metal plate including a base portion with a through hole for insertion of a fastening bolt and a free end portion formed therein with a slot to extensibly support a seat belt,
      a lower cover to cover one side of the base portion of the anchor metal plate,
      an upper cover to cover a head portion of the fastening bolt in opposition to the base portion of the anchor metal plate, and which is rotatably supported on a vehicle body by the fastening bolt, the upper cover including a contact rib protruding toward the lower cover from at least one inner side portion, the contacting rib contacting a portion of a lower sidewall protruding from an edge of a bottom plate of the lower cover, at least one arc-type rib protruding from a portion adjacent to an edge of a side portion of the base portion of the anchor metal plate provided on an inner surface of the bottom plate of the lower cover, and a connection rib connecting the arc-type rib and the lower sidewall;

a guide bar having a proximal end rotatable at a predetermined angle about the fastening bolt, and a distal end extending in a forward direction of the vehicle body, the fastening bolt passing through the guide bar between an outer surface of the lower cover and the vehicle body;

a belt guide connected to the distal end of the guide bar to support the seat belt, which has passed through the slot of the anchor metal plate, by allowing the seat belt to secondarily pass through the belt guide; and a housing coupled with the vehicle body to rotatably receive the proximal end of the guide bar, wherein a stopper guide protrudes from a cover portion of the housing facing the bottom plate of the lower cover to event the seat belt anchor from rotating when a head of an occupant collides with a side portion of the upper cover, and at least one arc-type slot is formed in the bottom plate of the lower cover adjacent to at least one side portion of the base portion of the anchor metal plate so that the stopper is inserted into the arc-type slot.

2. The seat belt apparatus of claim 1, further comprising:
at least one support protrusion formed on the inner surface of the bottom plate of the lower cover adjacent to the arc-type rib and having a support step with which the edge of the base portion of the anchor metal plate is securely fitted; and a lower coupling protrusion integrally formed with one side of the support protrusion of the lower cover so that the lower coupling protrusion is locked with an upper coupling protrusion formed on an internal bottom plate of the upper cover.

3. The seat belt apparatus of claim 1, further comprising:
a locking step protruding from one side of the edge of the base portion of the anchor metal plate; and a locking ring portion formed on the inner surface of the bottom plate of the lower cover provided at a position corresponding to a position of the locking step so that the locking step is inserted into the locking ring portion.

4. A seat belt apparatus for a vehicle, the seat belt apparatus comprising:
a seat belt anchor having:
an anchor metal plate including a base portion with a through hole for insertion of a fastening bolt and a free end portion formed therein with a slot to extensibly support a seat belt, a lower cover to cover one side of the base portion of the anchor metal plate, an upper cover to cover a head portion of the fastening bolt in opposition to the base portion of the anchor metal plate, and which is rotatably supported on a vehicle body by the fastening bolt, the upper cover including a contact rib protruding toward the lower cover from at least one inner side portion, the contacting rib contacting a portion of a lower sidewall protruding from an edge of a bottom plate of the lower cover, at east one arc-type rib protruding from a portion adjacent to an edge of a side portion of the base portion of the anchor provided on an inner surface of the bottom plate of the lower cover, and a connection rib connecting the arc-type rib and the lower sidewall;

a locking step protruding from one side of the edge of the base portion of the anchor metal plate; and a locking ring portion formed on the inner surface of the bottom plate of the lower cover provided at a position corresponding to a position of the locking step so that the locking step is inserted into the locking ring portion;

wherein an insertion protrusion and a screw coupling portion protrude from one side of the bottom plate of the lower cover which faces the locking ring portion; and wherein an insertion hole receiving the insertion protrusion and a screw coupling hole screw-coupled with the screw coupling portion are formed inside the anchor metal plate.

5. A seat belt apparatus for a vehicle, the seat belt apparatus comprising:
a fastening bolt;
a seat belt anchor having:
an anchor metal plate including a base portion with a through hole receiving the fastening bolt and a free end portion defining a slot for supporting a seat belt, a lower cover to cover one side of the base portion of the anchor plate, at least one arc-type slot is formed in a bottom plate of the lower cover adjacent to at least one side portion of the base portion of the anchor plate, an upper cover to cover a head portion of the fastening bolt in opposition to the base portion of the anchor plate, a guide bar having a proximal end and a distal end, the proximal end rotatable about the fastening bolt, the fastening bolt passing through the guide bar;

a belt guide connected to the distal end of the guide bar to support the seat belt by allowing the seat belt to pass therethrough;

a housing for coupling with a body of the vehicle, the housing rotatably receiving the proximal end of the guide bar; and a stopper protruding from a cover portion of the housing facing the bottom plate of the lower cover to prevent the seat belt anchor from rotating when a head of an occupant collides with a side portion of the upper cover, the stopper inserted into the arc-type slot.

6. The seat belt apparatus of claim 5, wherein the upper cover is adapted to be rotatably supported on a vehicle body by the fastening bolt.

7. The seat belt apparatus of claim 5, wherein the upper cover includes a contact rib protruding toward the lower cover from at least one inner side portion, the contacting rib contacting a portion of a lower sidewall protruding from an edge of a bottom plate of the lower cover.

8. The seat belt apparatus of claim 5, further comprising at least one arc-type rib protruding from a portion adjacent to an edge of a side portion of the base portion of the anchor metal plate provided on an inner surface of the bottom plate of the lower cover.

9. The seat belt apparatus of claim 8, further comprising a connection rib connecting the arc-type rib and the lower sidewall.

10. A seat belt apparatus for a vehicle, the seat belt apparatus comprising:
a fastening bolt;
a seat belt anchor having:
- an anchor plate including a base portion with a through hole receiving the fastening bolt and a free end portion defining a slot for supporting a seat belt,
- a lower cover to cover one side of the base portion of the anchor metal plate,
- an upper cover to cover a head portion of the fastening bolt in opposition to the base portion of the anchor metal plate,
a locking step protruding from one side of the edge of the base portion of the anchor plate; and
a locking ring portion formed on the inner surface of the bottom plate of the lower cover provided at a position corresponding to a position of the locking step so that the locking step is inserted into the locking ring portion,
wherein an insertion protrusion and a screw coupling portion protruding from one side of the bottom plate of the lower cover which faces the locking ring portion; and
wherein an insertion hole receiving the insertion protrusion and a screw coupling hole screw-coupled with the screw coupling portion are formed inside the anchor plate.

11. The seat belt apparatus of claim 10, wherein the upper cover is adapted to be rotatably supported on a vehicle body by the fastening bolt.

12. The seat belt apparatus of claim 10, wherein the upper cover includes a contact rib protruding toward the lower cover from at least one inner side portion, the contacting rib contacting a portion of a lower sidewall protruding from an edge of a bottom plate of the lower cover.

13. The seat belt apparatus of claim 10, further comprising at least one arc-type rib protruding from a portion adjacent to an edge of a side portion of the base portion of the anchor metal plate provided on an inner surface of the bottom plate of the lower cover.

14. The seat belt apparatus of claim 13, further comprising a connection rib connecting the arc-type rib and the lower sidewall.

\* \* \* \* \*